(12) United States Patent
Shih

(10) Patent No.: US 9,261,905 B2
(45) Date of Patent: Feb. 16, 2016

(54) ELECTRONIC DEVICE

(71) Applicants: INVENTEC (PUDONG) TECHNOLOGY CORPORATION, Shanghai (CN); INVENTEC CORPORATION, Taipei (TW)

(72) Inventor: Chia-Cheng Shih, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 93 days.

(21) Appl. No.: 14/227,881

(22) Filed: Mar. 27, 2014

(65) Prior Publication Data

US 2015/0153770 A1    Jun. 4, 2015

(30) Foreign Application Priority Data

Nov. 29, 2013    (CN) .......................... 2013 1 0630306

(51) Int. Cl.
    *G06F 1/16*    (2006.01)
(52) U.S. Cl.
    CPC ...................................... *G06F 1/162* (2013.01)
(58) Field of Classification Search
    CPC combination set(s) only.
    See application file for complete search history.

(56) References Cited

U.S. PATENT DOCUMENTS

| | | | | |
|---|---|---|---|---|
| 5,200,913 A * | 4/1993 | Hawkins | ................ | G06F 1/1615 345/168 |
| 6,714,408 B1 * | 3/2004 | Wang | .................... | G06F 1/1616 16/333 |
| 7,184,263 B1 * | 2/2007 | Maskatia | ............... | G06F 1/1616 248/917 |
| 7,486,503 B1 * | 2/2009 | Wang | .................... | G06F 1/1616 248/917 |
| 7,551,426 B2 * | 6/2009 | Huang | ..................... | G06F 1/162 361/679.02 |
| 7,570,482 B2 * | 8/2009 | Chan | ....................... | G06F 1/162 248/917 |
| 8,363,391 B2 * | 1/2013 | Kim | ....................... | G06F 1/1616 361/679.01 |
| 8,467,184 B2 * | 6/2013 | Chen | ....................... | G06F 1/162 361/679.55 |
| 8,587,938 B2 * | 11/2013 | Ahn | ....................... | G06F 1/1624 361/679.3 |
| 8,988,863 B2 * | 3/2015 | Hung | ..................... | G06F 1/1601 248/917 |
| 2005/0047070 A1 * | 3/2005 | Wang | ..................... | G06F 1/1681 361/679.27 |
| 2008/0174942 A1 * | 7/2008 | Yang | ..................... | G06F 1/1616 361/679.27 |
| 2009/0040701 A1 * | 2/2009 | Lin | ........................ | G06F 1/1616 361/679.27 |
| 2010/0118487 A1 * | 5/2010 | Ou | ........................ | H04M 1/0237 361/679.55 |
| 2011/0157793 A1 * | 6/2011 | Ma | ......................... | G06F 1/1679 361/679.01 |
| 2013/0077212 A1 * | 3/2013 | Nakajima | ............. | G06F 1/1643 361/679.01 |
| 2013/0088826 A1 * | 4/2013 | Kim | ....................... | G06F 1/1669 361/679.09 |

* cited by examiner

*Primary Examiner* — Lisa Lea Edmonds
(74) *Attorney, Agent, or Firm* — Huffman Law Group, PC

(57) ABSTRACT

An electronic device includes an input module, a connection assembly and a display module. The input module has a recess structure. The connection assembly includes a link member and a support plate. The link member has a first end and a second end, and the first end is pivotally disposed on one side of the input module. The support plate has a first edge and a second edge, and the first edge is pivotally disposed on the second end. The display module is pivotally disposed on the second edge. The recess structure is configured for accommodating the support plate.

6 Claims, 12 Drawing Sheets

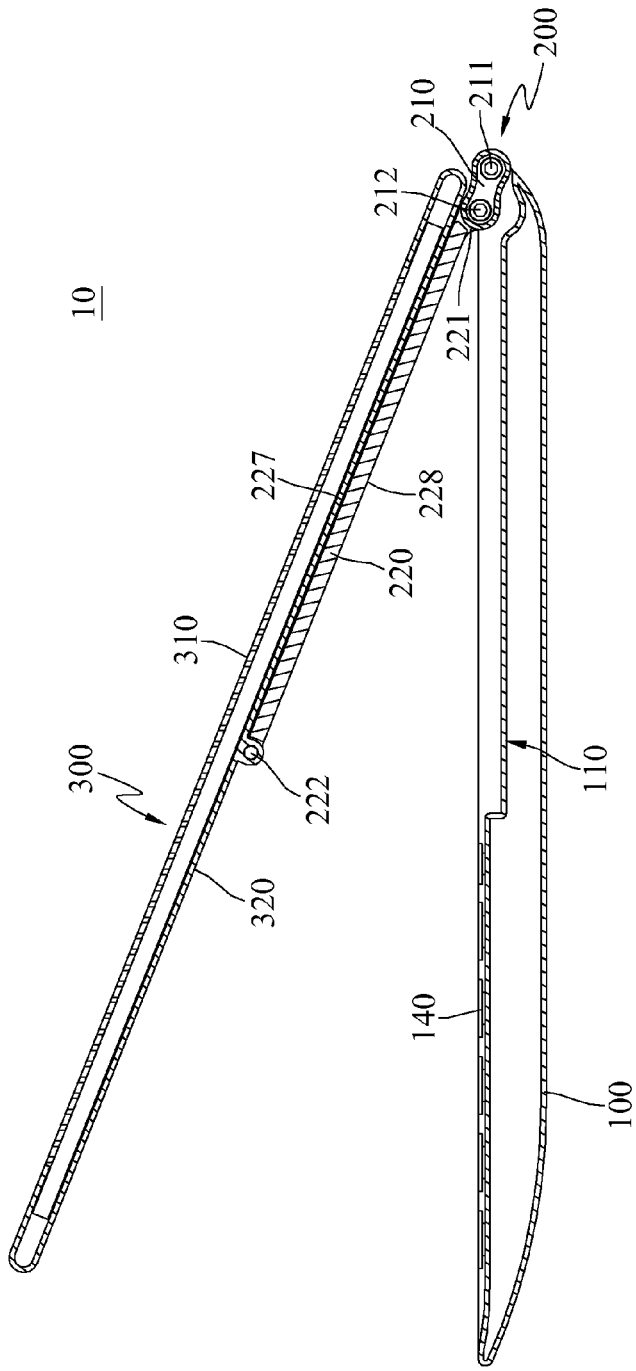
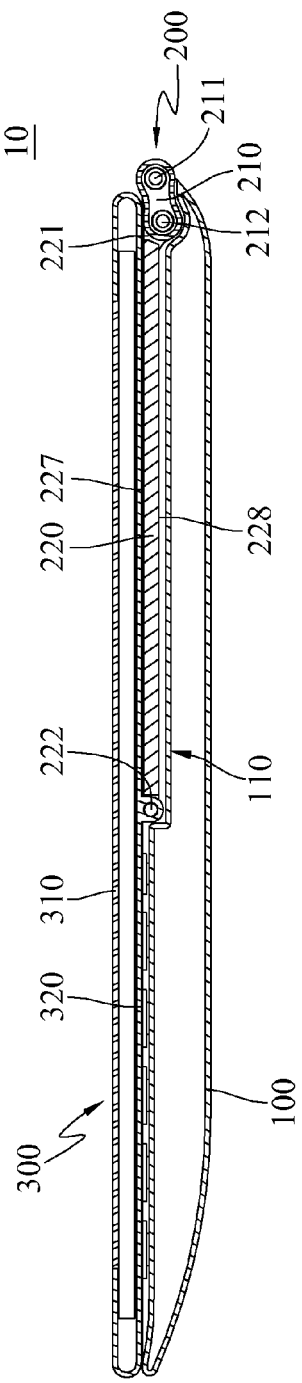
FIG. 3C
FIG. 3D

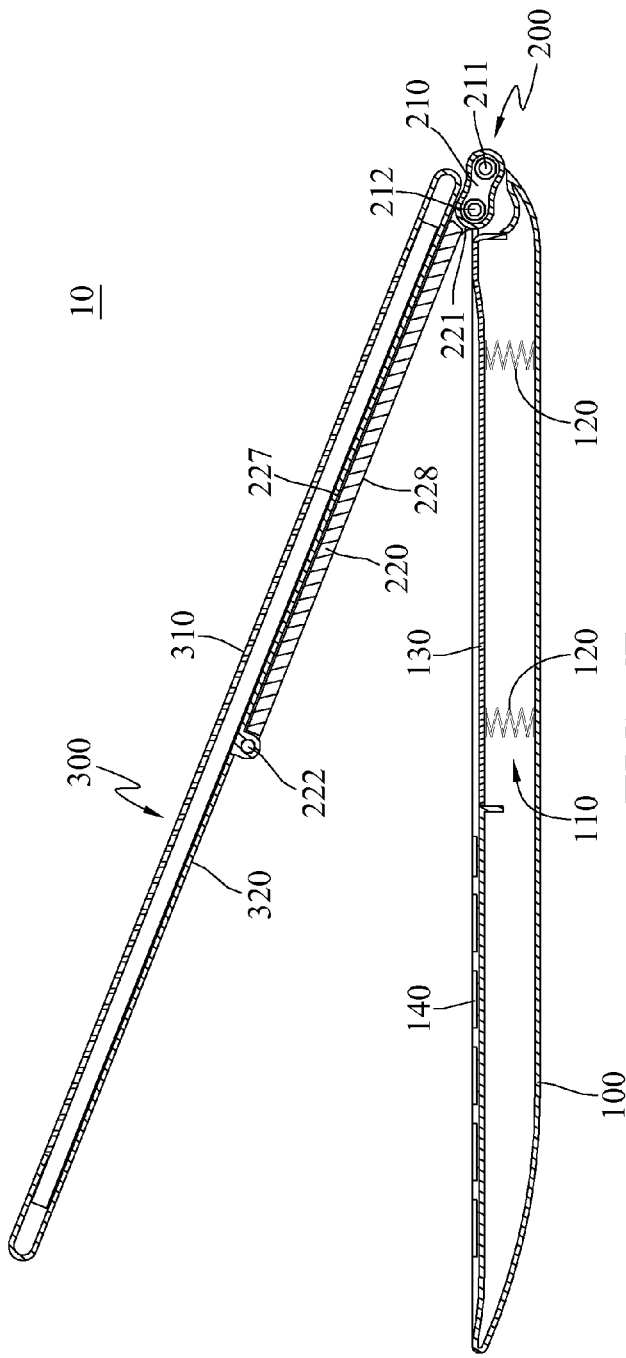
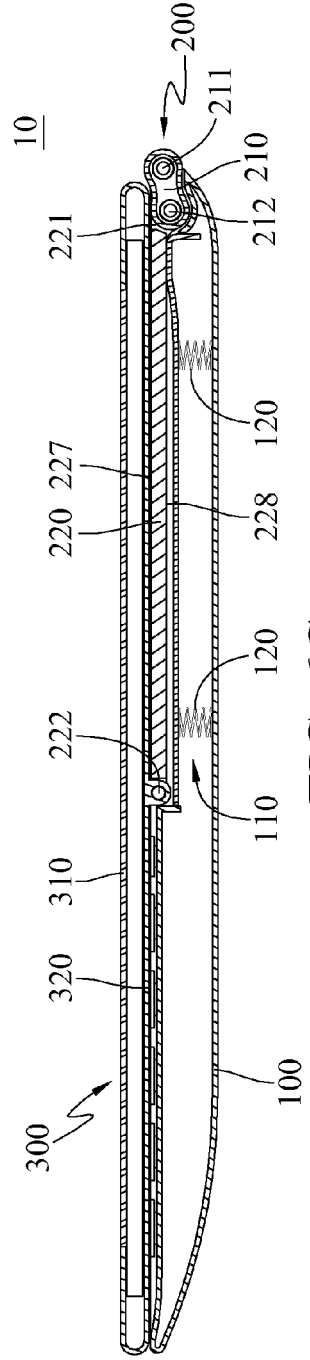
FIG. 6B
FIG. 6C

ELECTRONIC DEVICE

CROSS-REFERENCE TO RELATED APPLICATIONS

This non-provisional application claims priority under 35 U.S.C. §119(a) on Patent Application No(s). 201310630306.0 filed in China, P.R.C. on Nov. 29, 2013, the entire contents of which are hereby incorporated by reference.

BACKGROUND OF THE INVENTION

1. Technical Field of the Invention

The disclosure relates to an electronic device, more particularly to an electronic device with a touch screen.

2. Description of the Related Art

Nowadays consumers want their computers to be highly portable. To meet this requirement, the related industries have developed the tablet computer which is small and highly portable. The tablet computer comprises a touch screen, which allows users to operate by touching it, instead of inputting by mouse or keyboard in the traditional way. Most of the tablet computers allow users to touch, write and zoom in/out on the touch screen via their fingers. However, some users still want to use the traditional keyboard. Therefore, the laptop with the touch screen is launched for theses users. In this kind of laptop, the touch screen can be flipped to be located in certain positions for users to operate.

In today's laptop with the touch screen, when the back side of the screen faces the keyboard as well as leaning on them, the screen cannot fit the keyboard smoothly (or evenly). That is, a large gap is formed between the screen and the keyboard. The users may be confused and want to push the screen to eliminate this gap, which results in damages of the laptop. Hence, it is crucial to solve the problem that the back side of the touch screen cannot fit the keyboard smoothly.

SUMMARY OF THE INVENTION

An electronic device comprises an input module, a connection assembly and a display module. The input module has a recess structure. The connection assembly comprises a link member and a support plate. The link member has a first end and a second end, and the first end is pivotally disposed on one side of the input module. The support plate has a first edge and a second edge, and the first edge is pivotally disposed on the second end. The display module is pivotally disposed on the second edge. The recess structure is configured for accommodating the support plate.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein:

FIG. 3C is a sectional view of the electronic device according to the first embodiment of the disclosure;

FIG. 3D is a sectional view of the electronic device according to the first embodiment of the disclosure;

FIG. 6B is a sectional view of the electronic device according to the second embodiment of the disclosure;

FIG. 6C is a sectional view of the electronic device according to the second embodiment of the disclosure.

DETAILED DESCRIPTION

Figure 1:
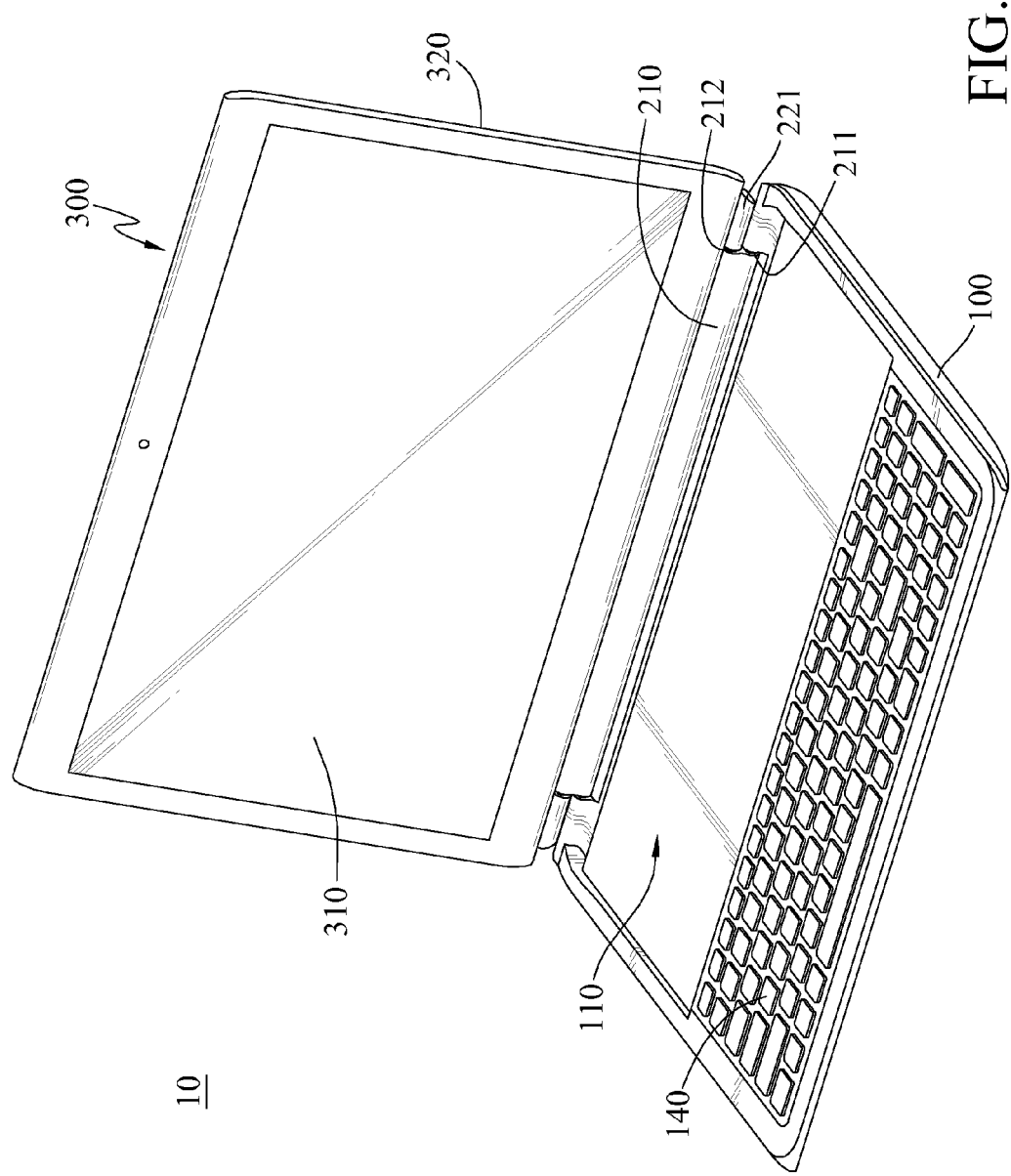
FIG. 1 is a perspective view of an electronic device according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
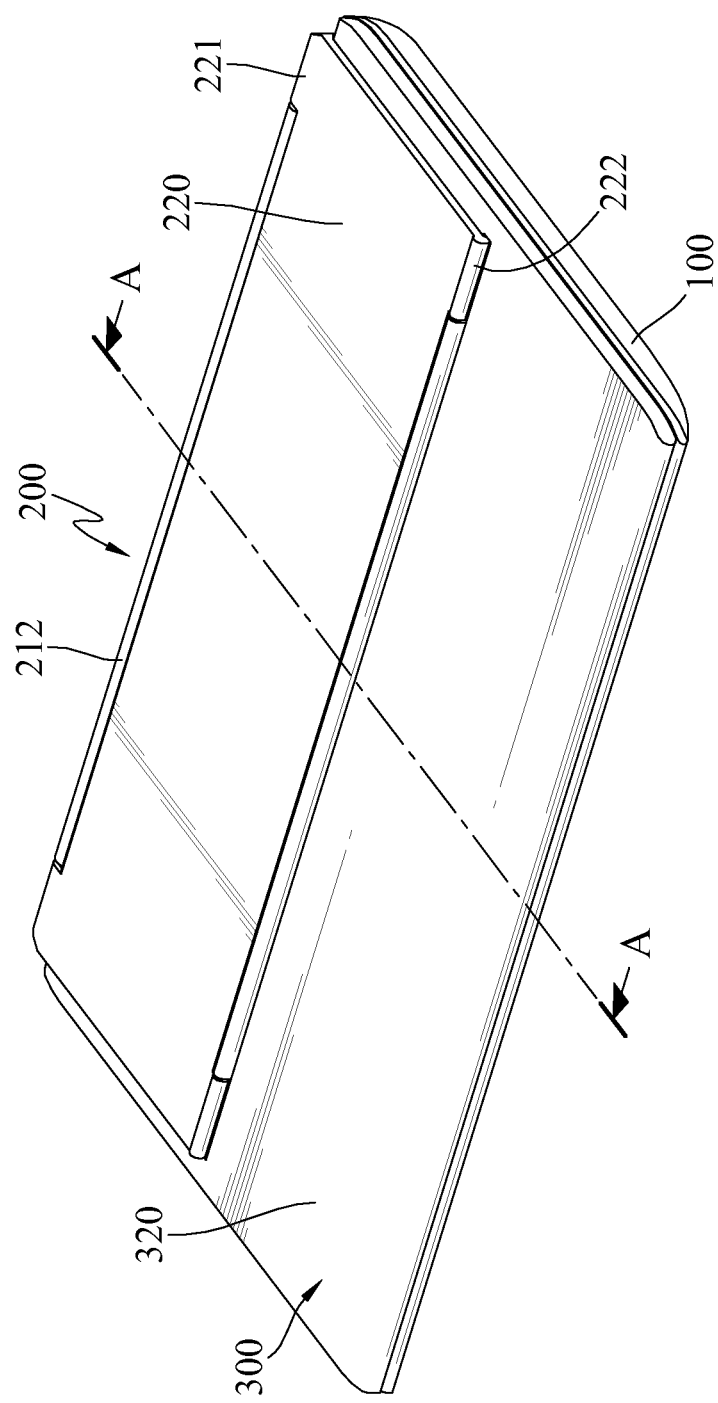
FIG. 2 is a perspective view of the electronic device in the close mode according to the first embodiment of the disclosure.

FIG. 1 is a perspective view of an electronic device according to the first embodiment of the disclosure; FIG. 2 is a perspective view of the electronic device in the close mode according to the first embodiment of the disclosure. As seen in FIGS. 1 and 2, an electronic device 10 comprises an input module 100, a connection assembly 200 and a display module 300.

The input module 100 has a recess structure 110. In this embodiment, the recess structure 110 is a recessed area a surface of the input module 100, and this recess structure 110 is inside the contour of this surface. As a result, the silhouette of the lateral sides of the electronic device 10 can remain smooth.

The connection assembly 200 comprises a link member 210 and a support plate 220. The link member 210 has a first end 211 and a second end 212. The first end 211 is pivotally disposed on one side of the input module 100. The support plate 220 has a first edge 221 and a second edge 222 that are opposite to each other. The first edge 221 is pivotally disposed on the second end 212, while the display module 300 is pivotally disposed on the second edge 222. In other words, the link member 210 is a hinge, the support plate 220 and the input module 100 are pivoted on two different axles of the link member 210, respectively.

In the electronic device 10 of this embodiment, the first end 211 of the link member 210 is pivotally disposed on the one side of the input module 110; the second end 212 is pivotally disposed on the first edge 221 of the support plate 220; the second edge 222 of the support plate is pivotally disposed on the display module 300. Therefore, this device becomes a double-cantilever type electronic device.

Figure 3A:
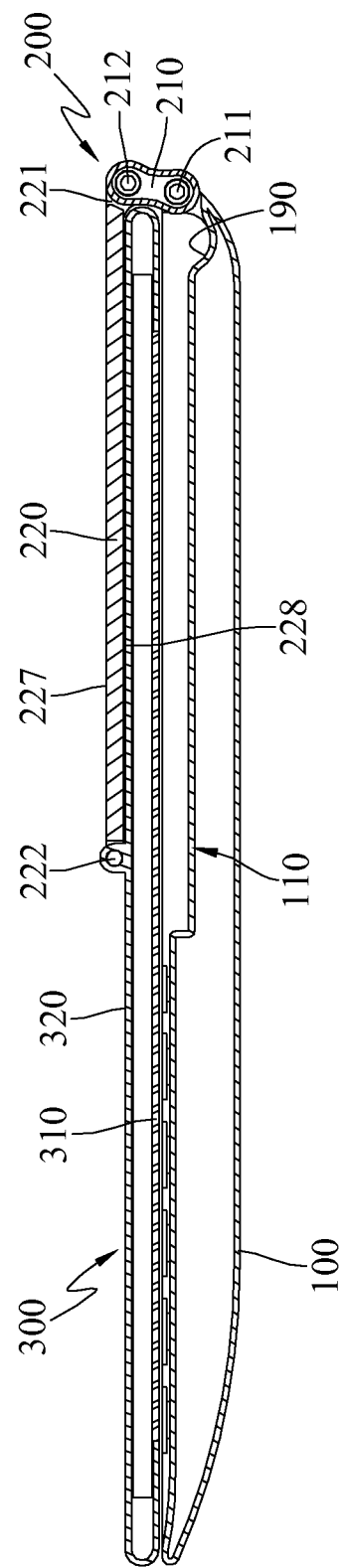
FIG. 3A is a sectional view of the electronic device according to the first embodiment of the disclosure.

Referring to FIGS. 3A to 3D, FIGS. 3A to 3D are sectional views of the electronic device 10. FIG. 3A shows the display module 300, in a close mode, covers the input module 100. The input module 100 has the recess structure 110 and an input surface 140. The support plate 220 has an upper surface 227 and a lower surface 228. The upper surface 227 is farther away from the input module 100 than the lower surface 228. The display module 300 has a display surface 310 and a back surface 320 opposite to each other. In this embodiment, the display module 300 is a monitor with a touch screen.

Figure 3B:
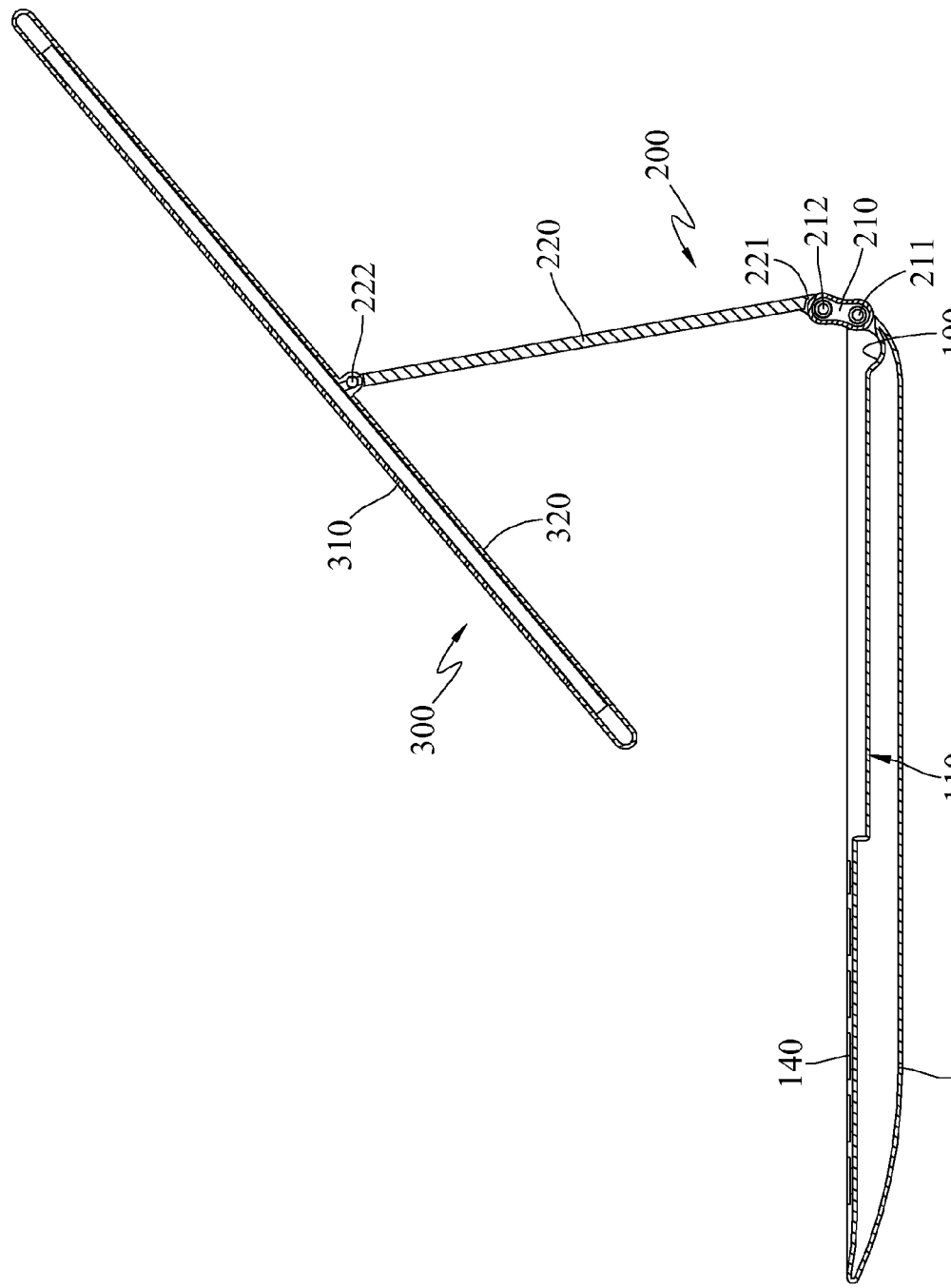
FIG. 3B is a sectional view of the electronic device according to the first embodiment of the disclosure.

When the display module 300 is in the close mode, it is disposed between the support plate 220 and the input module 100. Additionally, the back surface 320 of the display module 300 is attached to the lower surface 228 of the support plate 220, and the display surface 310 of the display module 300 is closer to the input module 100. When the users want to change the operational mode of the electronic device 10, they can rotate the display module 300 towards a direction away from the input module 100 (as seen in FIG. 3B). In this way, the users can operate this device as a normal laptop and they can even adjust the angle and the height of the display module 300.

Figure 4:
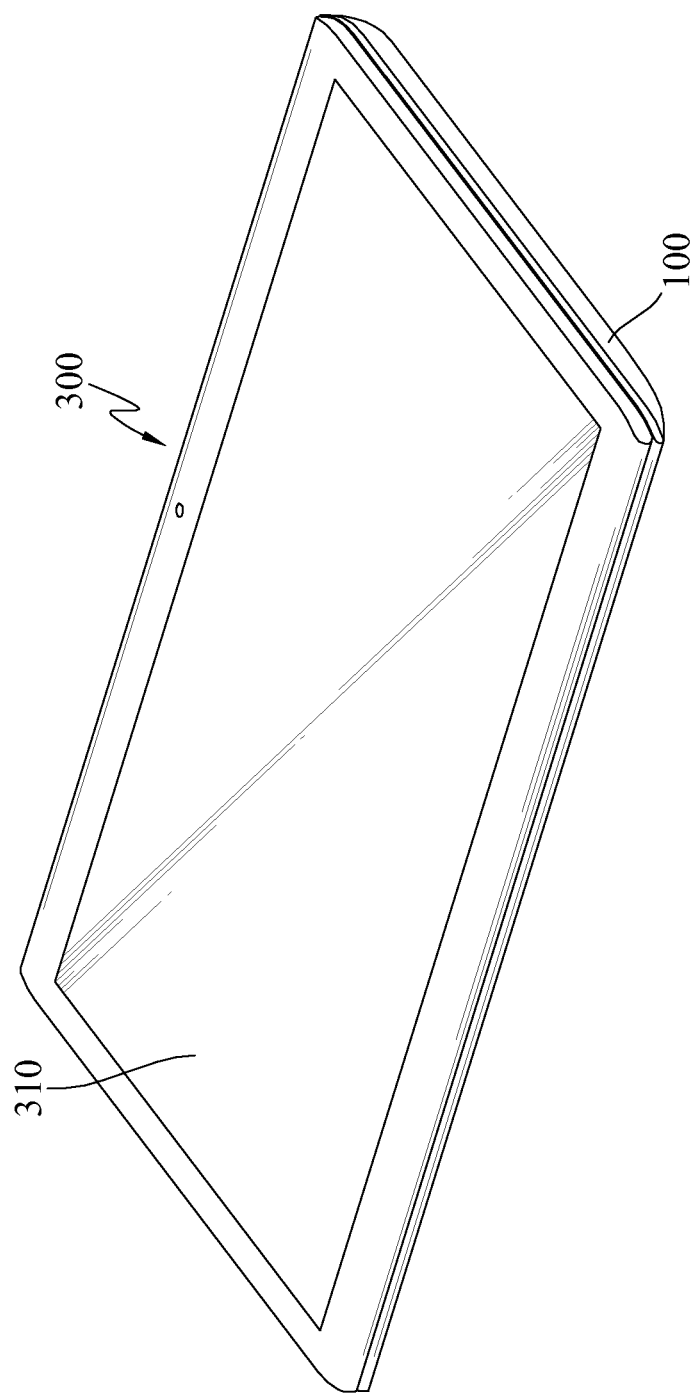
FIG. 4 is a perspective view of the electronic device in the tablet mode according to the first embodiment of the disclosure.

When the users want to use the electronic device 10 in a tablet mode, they can flip the display module 300 to make the back surface 320 of the display module 300 be attached to the upper surface 227 of the support plate 220, as shown in FIG. 3C. Then, the display module 300 and the support plate 200 is moved closer to the input module, and eventually the back surface 320 of the display module 300 is attached to the input module 100. The support plate 220, meanwhile, is located the recess structure 110. Thereby, in the tablet mode, the display module 300 can be attached to the input module 100 smoothly and there is almost no gap between them (as shown in FIG. 4). In other words, the display module 300 is precisely fitted in the recess structure 110.

In one embodiment, the input module 100 further has an accommodating groove 190 located near one side of the link member 210. When the electronic device 10 is in the tablet mode, the second end 212 of the link member 210 is located in the accommodating groove 190.

Figure 5:
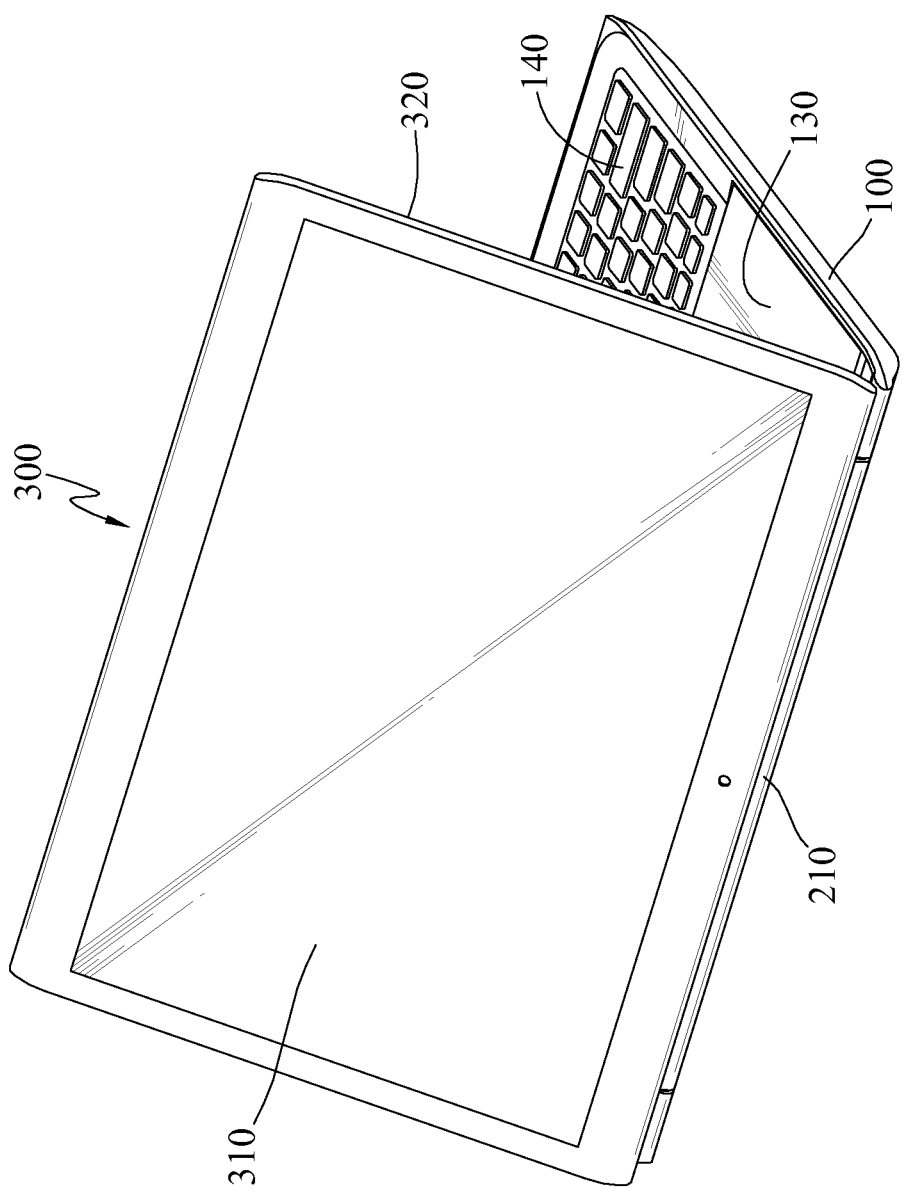
FIG. 5 is a perspective view of the electronic device in the special usage mode according to the first embodiment of the disclosure.

FIG. 5 is a perspective view of the electronic device in the special usage mode according to the first embodiment of the disclosure. As seen in FIG. 5, in the special usage mode, an angle is formed between the back surface 320 and the input module 100 and this angle is less than 180 degrees.

Figure 6A:
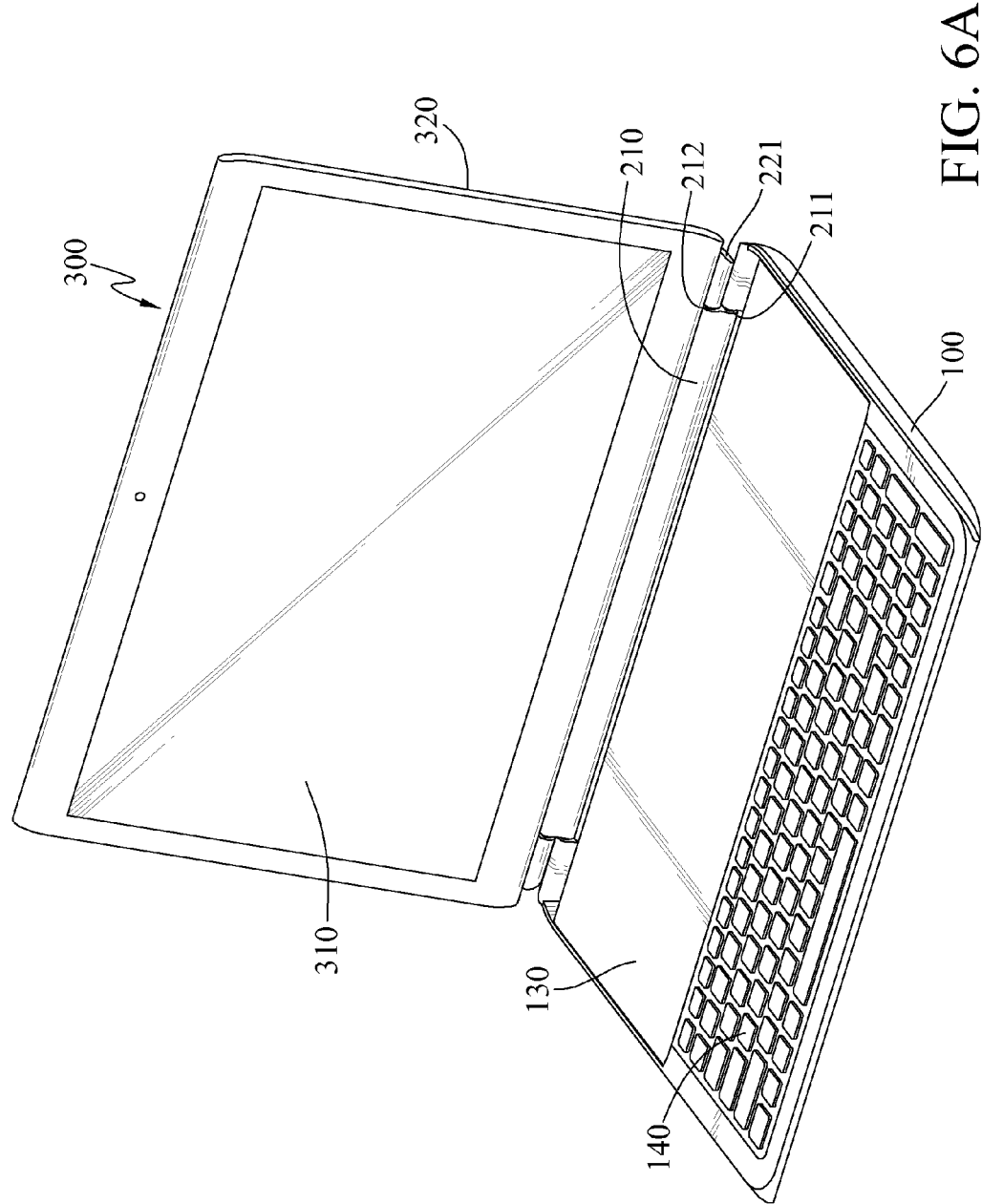
FIG. 6A is a perspective view of an electronic device according to the second embodiment of the disclosure.

FIG. 6A is a perspective view of an electronic device according to the second embodiment of the disclosure; FIG. 6B is a sectional view of the electronic device according to the second embodiment of the disclosure; FIG. 6C is a sectional view of the electronic device according to the second embodiment of the disclosure. As seen in FIGS. 6A to 6C, different from the first embodiment, in the second embodiment, the recess structure 110 further has a plate body 130 and two elastic members 120. One end of the elastic member 120 is disposed on one side of the plate body 130. Due to the arrangement of the elastic member 120, the plate body 130 can have a hold-up position and a sinking position. Moreover, in this embodiment, when the plate body 130 is at the hold-up position (that is, when the elastic members 120 are not compressed), the input surface 140 and the surface of the plate body 130 away from the two elastic member 120 are coplanar. Thereby, the surface of the input module 100 is leveled for being sleek. In this embodiments, the elastic members are springs, but the disclosure is not limited thereto. Also noteworthy is that, in other embodiments, the number of the elastic member 120 can be one or more than one.

In this embodiment, when the electronic device 10 is in the tablet mode, the display module 300 is stacked on the support plate 220 and the back surface 320 of the display module 300 is attached to the upper surface 227 of the support plate 220. The lower surface 228 of the support plate 220, meanwhile, pushes the plate body 130 and then makes it move from the hold-up position to the sinking position. The two elastic members 120, at this point, store elastic potential energy. When the users rotate the display module 300 to a direction away from the input module 100 so that the display module 300 is no longer in the tablet mode (as seen in FIG. 6B), the two elastic members release the elastic potential energy. The plate body 130, therefore, moves from the sinking position to the hold-up position. Thereby, the surface of the input module 100 is kept to be flat. Because of the design of the recess structure 110, the display module 300 in the tablet mode can be attached to the input module 100 evenly.

Figure 7:
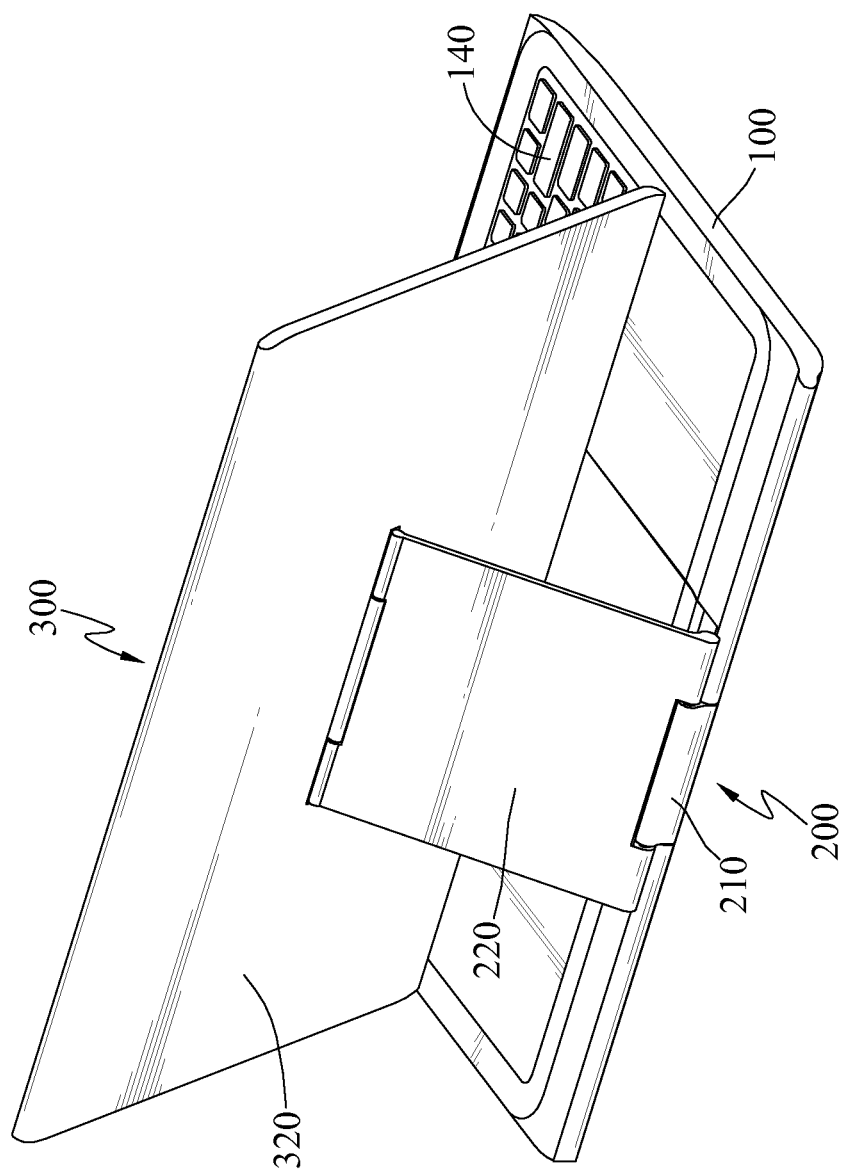
FIGS. 7 to 9 are perspective views of electronic devices with different structural designs.
Figure 8:
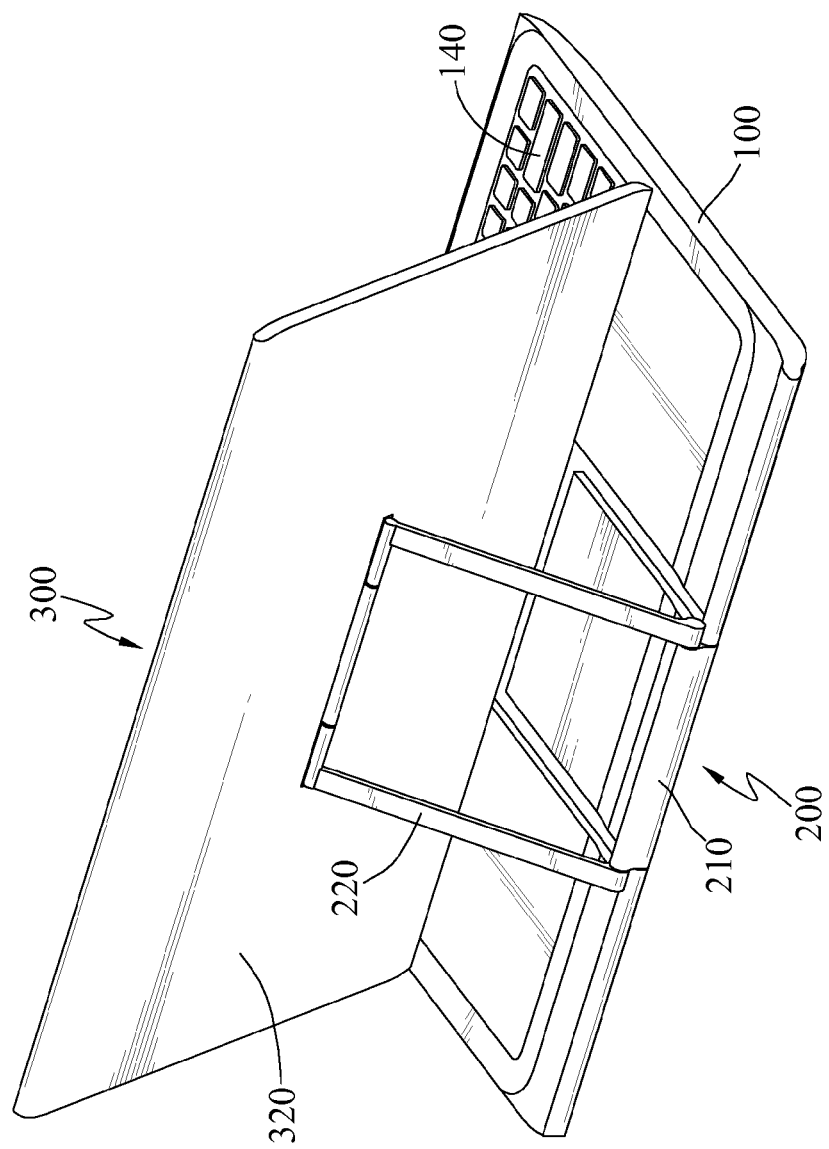
Figure 9:
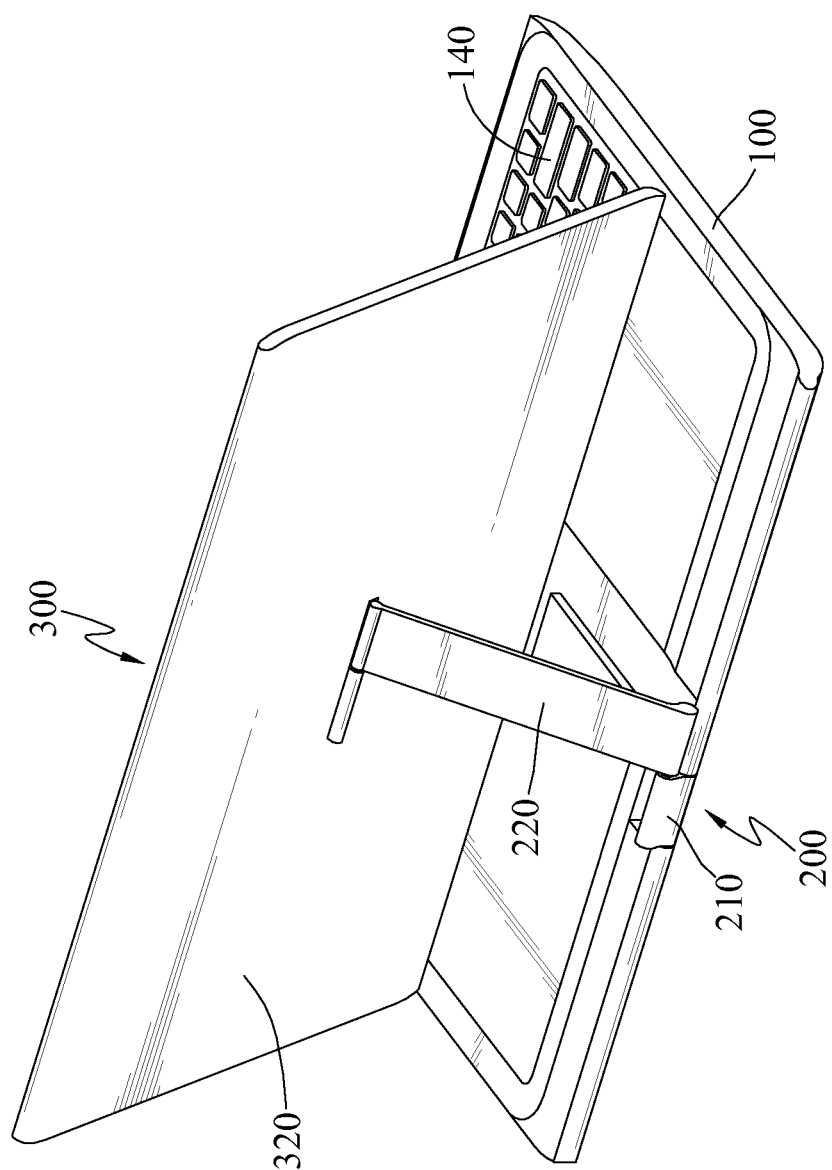

Furthermore, the support plate of the electronic device of the disclosure can have different structural designs. These designs are shown in FIG. 7 to FIG. 9.

To sum up, in the electronic device illustrated in the above-mentioned embodiments, the first end of the link member is pivotally disposed on one side of the input module and the first edge of the support plate is pivotally disposed on the second end of the link member. Additionally, the display module is pivotally disposed on the second edge of the support plate and the recess structure is disposed. Thereby, when the display module is working in the tablet mode, it levels with the input module smoothly. Thus, this avoids the damages of the conventional electronic device in the case that the users push the display module towards the input module because they want to eliminate the gap between them.

What is claimed is:

1. An electronic device comprising:
   an input module having a recess structure, the recess structure comprising at least one elastic member and a plate body, one end of the at least one elastic member disposed on one side of the plate body, and the plate body having a hold-up position and a sinking position, relative to the input module;
   a connection assembly comprising:
      a link member having a first end and a second end, and the first end being pivotally disposed on one side of the input module; and
      a support plate having a first edge and a second edge, and the first edge being pivotally disposed on the second end; and
   a display module pivotally disposed on the second edge,
   wherein the recess structure is configured for accommodating the support plate, when the display module is at a tablet position, the support plate pushes the plate body, so that the plate body moves from the hold-up position to the sinking position and the at least one elastic member stores elastic potential energy, while when the support plate moves away from the input module, the at least one elastic member releases the elastic potential energy, thereby making the plate body move from the sinking position to the hold-up position.

2. The electronic device according to claim 1, wherein the input module further has an input surface, and when the at least one elastic member is not compressed, the input surface and the surface of the plate body away from the at least one elastic member are coplanar.

3. The electronic device according to claim 1, wherein the display module is a touch screen.

4. The electronic device according to claim 1, wherein the input module further has a accommodating groove located on one side of the input module which is near the link member, and the accommodating groove is configured for accommodating the second end of the link member.

5. The electronic device according to claim 1, wherein the display module further has a tablet mode, and in the tablet mode, the display module is stacked on the support plate and the input module while the support plate is accommodated in the recess structure.

6. The electronic device according to claim 1, wherein the display module further has a close mode, and in the close mode, the display module is disposed between the support plate and the input module.

* * * * *